United States Patent

[11] 3,604,518

[72] Inventor Leonard F. Buchanan
350 Redwood Highway, Grants Pass, Oreg. 97526
[21] Appl. No. 643,138
[22] Filed June 2, 1967
[45] Patented Sept. 14, 1971

[54] PUSH-PULL GARDEN HOE
1 Claim, 5 Drawing Figs.
[52] U.S. Cl. .................................................. 172/372, 172/770
[51] Int. Cl. ..................................................... A01b 1/08
[50] Field of Search........................................... 172/372, 371, 365, 361; 56/DIG. 18; 294/53.5, 57, 58

[56] References Cited
UNITED STATES PATENTS
| | | | |
|---|---|---|---|
| 514,419 | 2/1894 | Evans............................ | 172/372 |
| 622,850 | 4/1899 | Haynes.......................... | 172/365 X |
| 2,134,070 | 10/1938 | Avant............................ | 172/371 |
| 797,840 | 8/1905 | Choate.......................... | 172/372 |

FOREIGN PATENTS
| | | | |
|---|---|---|---|
| 517,301 | 1/1940 | Great Britain................ | 172/372 |

Primary Examiner—Robert E. Pulfrey
Assistant Examiner—Stephen C. Pellegrino
Attorney—Clarence M. Crews ABSTRACT: A push-pull garden hoe is provided which has a blade in the form of a hollow triangle, with the inner and outer edges of each of the three triangle legs sharpened. The handle is rigidly anchored to the blade near the leading corner and near the middle of the trailing leg, with capacity for adjusting the slope of the handle relative to the blade.

The blade-anchoring means is located at substantial distances inward from the rear corners of the blade so that the rear corners are completely clear for precision hoeing immediately adjacent to a row of plants, and this without any substantial tendency to pile earth on the plants.

PATENTED SEP 14 1971 3,604,518
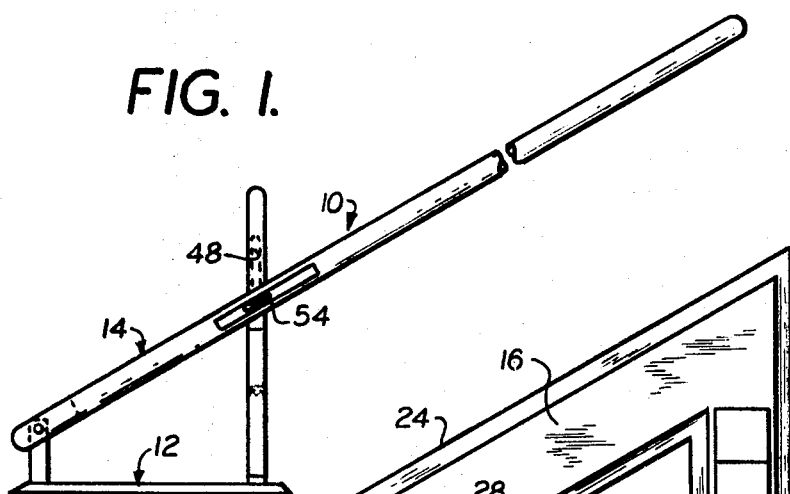
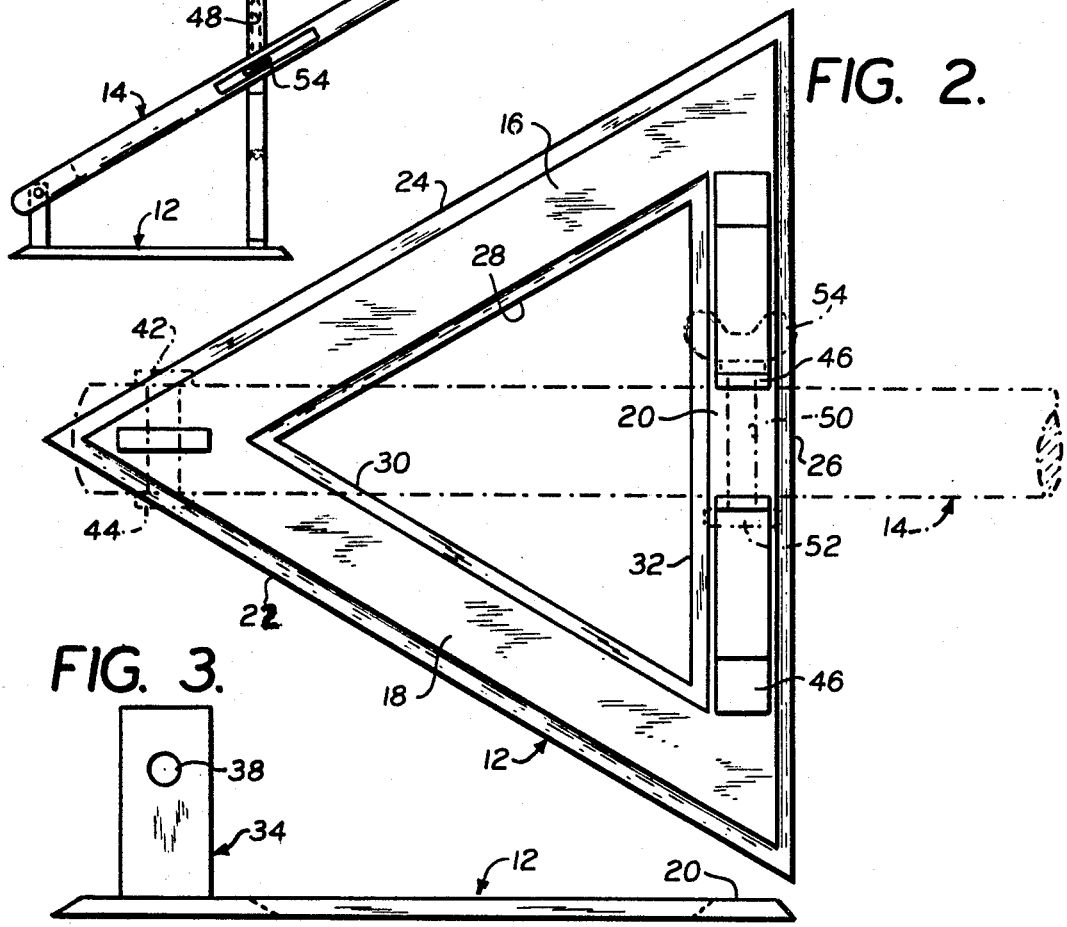
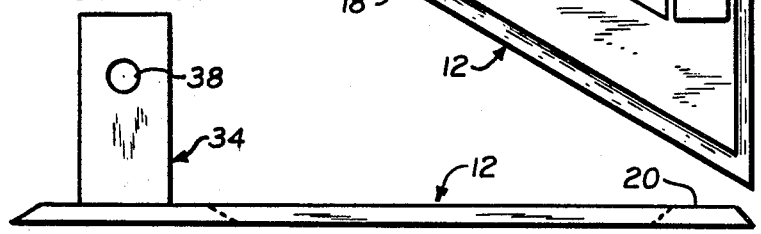
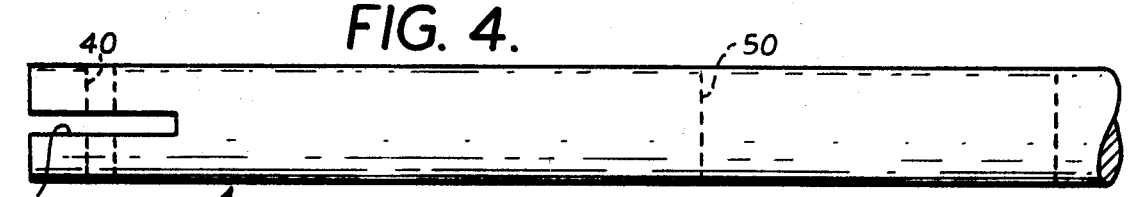
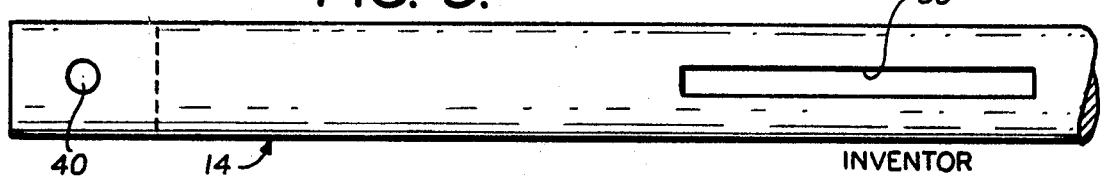
INVENTOR
LEONARD F. BUCHANAN
BY Clarence M. Crews
ATTORNEY.

PUSH-PULL GARDEN HOE

This invention relates to mulching and weeding garden hoes, and has for its primary object to provide a novel hoe which is more versatile, more efficient, and less fatiguing to use than any hoe previously available.

Mulching and weeding hoes of the prior art have taken a variety of forms. As a rule, however, they have generally been of the chopping or digging variety, or of the pusher or diamond point variety.

The chopping hoe somewhat resembles a mattock, but the blade is wider and much thinner and lighter than that of a mattock, and the handle is longer, lighter and of uniform diameter. The hoe blade is disposed nearly, if not quite, in a plane at right angles to the handle. This type of hoe is intended primarily for chopping or digging deeply into the earth, not only for cutting through the stems and roots of the weeds at or near ground level, but generally for digging under the weeds and uprooting them. A downward or digging stroke is generally followed by a lifting rearward stroke. The operation is tiring, tedious and discouragingly slow.

This kind of hoe can also be used as a pull type of hoe for simply cutting through the weeds at or near the surface of the ground, by holding the handle nearly upright and drawing the blade sharply to the rear in a path nearly parallel to the ground. This is an awkward and tiring method of using the hoe, but it eliminates the weeds much faster and easier than the digging method does.

In no way can a hoe of this type be used to cut weeds or to pulverize the ground on the forward stroke. The forward stroke is always an idle stroke.

Power tillers have substantially curtailed the use of hoes between rows of growing plants, so that for gardeners owning such tillers the hoe has been relegated to the working or mulching of the soil and the elimination of weeds closer to the rows than a tiller can be safely operated, and to the cleaning out of weeds right in the row between the plants. Precision hoeing in such cases takes on increased importance.

For the latter services the pusher or diamond point type of hoe is generally regarded as preferable to the chopping or digging type. One reason for this is that the diamond point hoe can be pushed and pulled in alternation, with the weight of the hoe resting continuously on the ground. This not only relieves the user of muscular exertion, but it increases the precision with which the work can be performed. The diamond point hoe can, moreover, be operated with one hand when the hoe is sharp and the work is light, and since each hand can be used by itself, each hand can spell the other, so that interruptions for rest can be brief and infrequent.

Where the digging hoe could only be active on the rearward or downward stroke, however, the diamond point hoe can only be active on the forward stroke. The rearward stroke is always a lost motion or idle stroke, even though the hoe may be dragged backward along the ground after each forward stroke.

It has been proposed to provide a push-pull type of hoe—that is, one having front and rear cutting edges and adapted to be pushed and pulled horizontally to cut weeds and both the forward stroke and the rearward stroke. Previous hoes of this type have had important drawbacks, however.

The blades have generally been made solid, with a single, broad, transversely extending cutting edge at the rear. At the start of the rearward stroke the blade must be tilted rearward and downward slightly so that the blade can cut down into the earth. Unless the tilt is altered at just the right moment and to just the proper amount, however, the blade may bury itself in the ground deeper than intended. This will rarely stall the stroke, but it will frequently make the execution of the stroke much more laborious than is desirable, because of the solid mass of earth which must be moved in order to extricate the blade. This can only be avoided by the exercise of vigilance and considerable skill. No amount of skill, however, can prevent the near stalling of the stroke through burying of the blade, if the blade strikes an obstruction which deflects it downward as it is being drawn rearward. Hoes of this kind have not, so far as I am aware, enjoyed any substantial measure of commercial acceptance.

Other push-pull hoes have been essentially the familiar diamond point hoe with the rear edges of the two angularly related blade arms sharpened so that the rearward stroke, as well as the forward stroke, will be a cutting stroke. Blade structures of this kind do not provide a practical and desirable way of attaching the handle to the blade. Either the handle is rigidly and fixedly attached to the blade at a single point or at two closely adjacent points near the forward extremity of the blade, or it is rigidly and fixedly attached only at the rear, through a relatively massive yoke which weighs nearly as much as the blade itself, and in which the yoke ends tend to interfere with, or actually prevent, the entry of the rear blade edges into the ground on the rearward stroke, and to restrict precision hoeing.

It is a salient feature of the present invention that a tilling or mulching, and weeding hoe of the push-pull type is provided having a much higher ratio of cutting edge length to blade weight than any hoe heretofore devised, with the bounding cutting edges all running to the corners of the triangular blade.

It is a further important feature that a push-pull hoe is provided having a hollow triangular blade with the outer edges of all three blade legs sharpened, so that if the hoe on either the forward or reverse stroke tends to dig too deeply into the ground, the undercut earth can be readily subdivided, with a substantial portion passing freely through the opening in the hollow blade body, and no serious obstruction interposed to the rectification and completion of the stroke. The subdivision of the undercut earth is facilitated by sharpening the inner edges of the legs of the triangular blade. If the weeds are thick and tough the going is heavier, but the hollow construction takes on added importance. When hoeing near the row, there is a tendency to pile the mulched earth on the plants. This is substantially obviated by the large opening provided in the blade.

In accordance with a further and more specific feature, the tip of the blade, in front of the blade opening, and the middle portion of the rear leg of the hollow blade behind the blade opening, are utilized for effecting widely spaced connections of the handle to the blade, so that no excessive strain will be imposed on any single point of connection, and so that the force exerted by the handle on the blade in either direction will be a force which pulls the front and rear extremities of the blade in unison and along a common line of pull, rather than an unbalanced, distorting thrust.

It is a point that the rear connection of the handle to the blade is effected at points which, though wall spaced from each other, are located well inward from the ends of the rear leg, so that the rear corners of the blade which are sharp-edged corners, are left completely free for precision hoeing.

It is a still further feature of the invention that a hoe of the push-pull type is provided having a hollow triangular blade in which the handle is connected to the blade at widely spaced points, and with capacity for angular adjustment of the handle, to change the slope of the handle relative to the blade. The slope of the handle may thus be accommodated to the physical characteristics of the user.

Other objects and advantages will hereinafter appear.

In the drawing forming part of this specification,

FIG. 1 is a view in side elevation, partly broken away, of a practical and advantageous push-pull hoe, chosen for illustrative purposes, and embodying features of the invention;

FIG. 2 is a plan view on a larger scale than FIG. 1, of the hoe blade, with a fragment of the handle and the handle attaching means shown in broken lines;

FIG. 3 is a view in side elevation of the blade; and

FIGS. 4 and 5 are fragmentary top and side views, respectively, showing the lower end of the handle.

As noted above, the illustrative hoe 10 is a push-pull hoe. It comprises a unitary metallic blade 12 and an elongated wooden handle 14. The blade 12 is shown as having the form of a hollow, equilateral triangle, comprising two lateral legs 16 and 18 and a transverse base leg 20 at the rear. It is not essential that the triangle be equilateral in form, but the legs 16 and 18 are most desirably made equal in length and are made to form equal angles with the vertical central plane of the handle, for tending to balance the lateral forces which come into play during the forward stroke of the hoe. The legs are sharpened to form outer cutting edges 22, 24 and 26, and, if desired, inner cutting edges 28, 30 and 32.

A post 34 is provided near the tip of the blade 12 for anchorage of the forward end of the handle 14. The post extends upward from the blade 12, being secured to the blade in any suitable manner, as by welding. The post is desirably a thin, flat member, being confined substantially to a vertical plane which includes the tip of the blade and which bisects the base leg 26 of the blade. The thin formation of the post is desirable, both because it avoids causing any substantial obstruction to the travel of the blade through the ground, and because it enables the upper end of the post to be freely received in a slot 35 which is provided in the forward end of the handle 14. A through fastener, desirably in the form of a headed bolt 42, has its cylindrical shank passed through the bores 38 and 40, and is retained in place by a nut 44. The blade 12 and the handle 14 are free to rock relative to one another about the pivot provided by the bolt 42, in the absence of further anchorage.

Bracket means, desirably composed of two bracket members 46, is provided on the base leg 20 of the blade 12. In order to provide a rigid handle connection, the bracket members are secured, as by welding, to the blade leg 20 in areas well removed from the midpoint of the leg 20, but in order to leave the rear corners of the blade completely clear for precision hoeing the areas of connection of the bracket members 46 to the leg 20 are spaced substantially inward from the ends of the leg 20.

The upper ends of the bracket members 46 are spaced from one another by a distance equal to the thickness or diameter of the handle 14 and are formed with transversely aligned slots 48, while the handle 14 is formed with an opening or slot 50. A through fastener in the form of a headed bolt 52 is passed through the slots 48 and 50, and a wingnut 54 is applied to the threaded end of the bolt to retain the bolt in place. The handle is then adjusted by the user to the slope thought to be most advantageous, and the wingnut is tightened to clamp the brackets and the handle firmly together to fix the adjustment. The handle can, of course, be readjusted to a different slope, as desired, by temporarily backing off the wing nut.

Because of the mutual reinforcement which the triangle legs provide for one another, the present blade can be made of substantially lighter gauge metal than can practically be employed in a diamond point hoe.

The blade can be composed of conventional hoe metal which requires sharpening from time to time and which can be sharpened by a file, or it can be composed of steel which is casehardened after sharpening, and which requires replacement of the blade after a long period of use.

The usefulness of the inner cutting edges 28, 30 and 32 in helping to subdivide undercut earth so that a portion can pass through the blade opening has been emphasized above, but that is not the sole reason for providing these cutting edges. The hoeing of a garden is not a cut and dried proposition, with every stroke like every other stroke. There will be times when the tip of the blade comes out of the ground prematurely and merely scrapes or flattens the weeds with which it comes into contact, and the blade edge 32, following at a lower level, will make up for the deficiency by slicing the missed weeds off at or near ground level. Again, on the backward stroke weeds missed or inadequately cut by the blade edge 26 will be destroyed by the blade edges 28 and 30.

The slope of the handle relative to the blade can be varied through fairly wide limits, but a slope range in the neighborhood of 25° to 35° will provide slopes appropriate for all users. The desired adjustment will depend on the height of the user, the length of his arms, other physical characteristics, and the manner of manipulating the hoe which is most comfortable and effective for him.

Although the hoe is capable of being used to cut weeds on every forward stroke and every backward stroke, it is not essential that it be so used. The most precise work can be done by the rear corners of the blade as the blade is drawn backward, and at times the hoe will be used in this manner without making any effort to utilize the forward stroke. The most rapid operation, however, can be realized on the forward stroke, and out between the rows, and at times the primary emphasis may be put on a succession of rapid and vigorous forward strokes. One user may strongly prefer the forward stroke as the primary working stroke, and another the backward stroke as the primary working stroke, but the majority of users will, for most purposes, prefer generally to take full advantage of both strokes. All methods are available at all times.

The present hoe can do everything that any previous hoe of the diamond point type or of the pull type, or of the push-pull type can do, and it can do it better, more conveniently, and with less effort, and with less extensive and less massive shifting of earth.

I have found it most advantageous to make the linear dimensions of the opening in the hoe blade at least half as great as the corresponding dimensions of the blade itself.

I have described what I believe to be the best embodiments of my invention. I do not wish, however, to be confined to the embodiments shown.

I claim:

1. A push-pull garden hoe adapted to weed and/or mulch beneath the surface of the ground on either the forward or reverse stroke or both, comprising, in combination,
    a. an integral, rigid metallic blade member in the form of a triangle having narrow marginal portions which are bounded interiorly by a hole of triangular shape, the three edges of the hole being parallel, respectively, to the three peripheral edges of the blade and spaced substantially equally from said edges, the perimeter of the hole being at least one-half as great as the perimeter of the blade, the outer edges of all three legs being sharpened continuously from end to end so that all three pairs of sharpened peripheral cutting edges meet in acute angles at the three vertices of the triangular blade to form sharp corners, the triangular blade having one vertex disposed to define a forward acute angled tip from which the two forward external edges diverge symmetrically, and a leg opposite said vertex disposed to form a transversely extending, rearwardly disposed base, the entire blade forming a terminus of the hoe which is free from obstructing protrusions of any kind.
    b. a post member, unitary with the blade in front of the blade opening at a point adjacent the forward tip of the blade, and extending upward therefrom,
    c. bracket members, unitary with the base leg of the blade in back of the blade opening, and extending upward therefrom, said members being well removed from such post and spaced inward substantial, equal distances from the ends of the base,
    d. an elongated handle member, and
    e. handle connecting means rigidly securing the handle member to the post member and through the bracket members at a fixed, rearwardly rising, determined slope relative to the blade.